United States Patent [19]

Mehalso et al.

[11] 3,901,994

[45] Aug. 26, 1975

[54] METALLIZED VIDEO DISC HAVING A DIELECTRIC COATING THEREON

[75] Inventors: Robert Michael Mehalso, Trenton; Grzegorz Kaganowicz, Princeton, both of N.J.

[73] Assignee: RCA Corporation, New York, N.Y.

[22] Filed: Feb. 4, 1974

[21] Appl. No.: 439,582

[52] U.S. Cl. ....... 428/163; 178/6.6 A; 179/100.1 B; 204/168; 260/2 H; 274/42 R; 427/39; 427/79; 427/248; 428/463

[51] Int. Cl.$^{2}$ ..................... G11B 3/70; G11B 25/04

[58] Field of Search .. 117/93.1 GD, 106 R, 161 UF, 117/200, 201, 230, 232; 204/168; 260/2 H; 235/116; 178/6.6 A; 179/100.1 B, 100.4 R; 274/42 R

[56] References Cited

UNITED STATES PATENTS

| | | | |
|---|---|---|---|
| 3,246,627 | 4/1966 | Loeb et al. | 118/49 |
| 3,252,830 | 5/1966 | Cummin et al. | 117/93.1 GD |
| 3,342,754 | 9/1967 | Gorham | 117/106 R |
| 3,402,073 | 9/1968 | Pierce et al. | 117/93.1 GD |
| 3,666,533 | 5/1972 | Lee | 117/93.1 GD |
| 3,753,773 | 8/1973 | Lee | 117/106 R |
| 3,842,194 | 10/1974 | Clemens | 178/6.6 A |

*Primary Examiner*—J. H. Newsome
*Attorney, Agent, or Firm*—Glenn H. Bruestle; Donald S. Cohen; Carl L. Silverman

[57] ABSTRACT

Poly-p-xylylene is utilized for a thin conformal dielectric coating on metallized discs. The poly-p-xylylene coating is deposited by vapor deposition and then hardened by exposure to a glow discharge. A method of hardening a polymeric dielectric coating by exposure to a glow discharge after the coating has been deposited on the disc.

4 Claims, No Drawings

METALLIZED VIDEO DISC HAVING A DIELECTRIC COATING THEREON

BACKGROUND OF THE INVENTION

This invention relates to the manufacture of video discs and particularly to manufacturing a video disc having a durable dielectric coating thereon with excellent playback qualities.

Recording and playback systems have been developed wherein a video disc is utilized to store information. According to one method, as described by Clemens in copending application Ser. No. 126,772, filed Mar. 22, 1971 now Patent No. 3,842,194, conductive discs are prepared having geometric variations in the bottom of a spiral groove in the disc surface which correspond to capacitance variations representative of the stored information. The conductive disc is obtained by metallizing the surface of a vinyl disc. The conductive discs are then coated with a thin conformal dielectric coating. A stylus having a metallic electrode completes the capacitor, and, during playback, rides upon the dielectric coating, detecting the variations in the groove. These variations are reconstituted in electrical signal form and converted back to the stored information which can be viewed in a television monitor capable of displaying the stored audio and visual information.

The stylus is separated from the conductive disc surface by the thin conformal dielectric coating. For quality recordings, it is necessary that the dielectric coating meet very stringent requirements. For example, the most desirable dielectric coating would be uniform in thickness and composition, as well as conforming to the geometric variations in the grooves, yet without faults or pinholes. In addition, the dielectric coating must be strong enough to withstand repeated passes of the stylus without damage to the coating itself or to the variations in the disc, yet the coating must not be so hard as to unduly wear the stylus. Present discs employ polymers such as polystyrene for the thin conformal dielectric coating. However, present dielectric coating techniques enhance the roughness of the surface of the metallized disc causing the stylus to bounce off and back on the metallized surface. Furthermore, present dielectric coatings have little elasticity thus causing rapid wear of the stylus as well as eventual damage to the groove dimensions as the stylus bounces up and down along its spiral path. A conformal dielectric coating of poly-p-xylylene meets all but one of the stringent requirements; the coating is too soft, being capable of providing only about 100 plays of satisfactory quality.

In addition, after a polymeric dielectric coating has been applied to a disc by conventional means, e.g., vapor deposition, it is often necessary to further harden the coating without disturbing the structure of the disc. Hardening a polymeric coating involves increasing the degree of crosslinking in the polymer as well as the molecular weight of the polymer. The most common technique for hardening polymeric coatings, heating the coating, is unacceptable as the necessary temperature for hardening, about 210°F, is too high for the vinyl disc to withstand without incurring structural defects. Another technique for hardening polymeric coatings, ultraviolet radiation, is not effective for all polymeric coatings.

SUMMARY OF THE INVENTION

A polymeric dielectric coating on the surface of a conductive disc is hardened by exposing the coating to a glow discharge after the coating has been deposited on the conductive disc. An improved information storage means of the type having capacitance variations which can be displayed through a playback system. The information storage means includes a conductive disc having information recorded in the form of geometric variations in the surface thereof with a thin conformal coating thereon of poly-p-xylylene. The storage means is improved by hardening the coating by glow discharge techniques.

DETAILED DESCRIPTION OF THE INVENTION

According to the present invention, a metallized vinyl disc, i.e., a conductive disc, having a spiral groove therein can be coated with poly-p-xylylene, e.g., poly-p-chloro-xylylene. It is necessary, in order to successfully coat a surface with a truly linear poly-p-xylylene coating, to first cleave the cyclic dimer, di-p-xylylene, to obtain the reactive vaporous radicals which are then condensed upon the surface, wherein the radicals condense and polymerize to form a linear homopolymeric or copolymeric coating depending upon the initial choice of dimeric reactants, system pressure, and the temperature of the surface to be coated. The vapor deposition takes place in apparatus similar to that described in U.S. Pat. No. 3,246,627 entitled "Apparatus For Vapor Deposition," issued on Apr. 19, 1966. Poly-p-xylylene coatings can be prepared by methods well known in the art, e.g., as described in U.S. Pat. No. 3,288,728 entitled "Para-Xylylene Copolymers," issued Nov. 29, 1966 and U.S. Pat. No. 3,342,754 entitled, "Para-Xylylene Polymers," issued Sept. 19, 1967. Poly-p-chloro-xylylene can be prepared as described in the latter patent. Standard deposition techniques are employed wherein one skilled in the art is able to produce thin conformal coatings without pinholes, e.g., less than 500 Angstroms, hereinafter A.

The coated disc is then coated with a lubricant such as the standard 50 centistoke viscosity methyl alkyl silicone which is commercially available as SF 1147 50 centistoke from General Electric. The coated discs have a playing life of about 100 plays which is satisfactory for some purposes.

According to the method of the present invention, an applied dielectric coating on a metallized vinyl disc, such as a coating of poly-p-xylylene, can be subsequently hardened by exposing the coated disc to a glow discharge. The conductive disc is exposed to a glow discharge prior to being coated with the standard lubricant. The use of glow discharge techniques for the application of thin films is well known, e.g., U.S. Pat. No. 3,318,790 entitled, "Production of Thin Organic Polymer By Screened Glow Discharge," issued on May 9, 1967. The application of the dielectric coating itself need not be done with glow discharge, e.g., conventional vapor deposition will suffice, as described in the aforementioned U.S. Pat. No. 3,246,627 or any other method amenable to mass production. The dielectric material, coating thickness, and hardness desired determine the operating parameters of the glow discharge which can be readily determined by a series of test runs by one skilled in the art.

It was found that exposing a coated video disc to a glow discharge of 10 Hz to 30 KHz, for times greater than 30 seconds, increases the hardness of the coating. The coated video disc is mounted in a vacuum chamber where the glow discharge is to take place. The chamber is then evacuated, preferably to a pressure in the range of 1 to 20 microns. Then, an ionizing material, e.g., nitrogen, air, etc., is pumped into the chamber to a pressure of from 50 to 1000 microns. A potential of from 600 to 800 volts is applied. The glow discharge increases the degree of crosslinking and the molecular weight of the coating and thus can be successfully employed for hardening most polymeric coatings.

The invention can be further illustrated by the following example, but it is to be understood that the invention is not meant to be limited to the details described therein.

EXAMPLE

A vinyl disc, metallized with a gold layer was coated with poly-p-chloro-xylylene. The poly-p-chloro-xylylene coating was approximately 470A thick and was applied by vapor deposition, e.g., as described in the aforementioned U.S. Pat. No. 3,246,627. The coating was capable of about 100 satisfactory plays before a plastic deformation of the poly-p-chloro-xylylene dielectric coating became evident under the pressure of the stylus. Although this number of plays is satisfactory for some purposes, a prolonged record life is desirable as a safety factor.

The video disc coated with poly-p-chloro-xylylene was mounted in a vacuum chamber between two spaced parallel electrodes. The coated disc was placed in contacting relation with one of the electrodes with its coated side facing the other electrode. The chamber was evacuated to a pressure in the range of 1 to 10 microns and then air was pumped into the chamber to a pressure of about 500 microns. The electrodes were connected to a source of current such that the applied potential during glow discharge was 650 volts.

A 20 KHz current was turned on for ten minutes so as to establish a glow to which the coated side of the disc was uniformly exposed. The disc was taken out of the vacuum and coated with a lubricant such as the aforementioned SF 1147 50 centistoke available from General Electric.

After exposure to the glow discharge and after being coated by the standard lubricant, the video disc was played on a standard player with the picture quality being evaluated by dropout count. No increase in dropout count or visual degradation of the picture was observed for 1200 plays.

We claim:

1. An information storage means of the type wherein capacitance variations are provided to a playback system and said storage means includes a conductive disc having information recorded in the form of geometric variations in the surface thereof, wherein the improvement comprises:

a dielectric coating of hardened poly-p-xylylene on said conductive disc, said coating hardened by exposure to a glow discharge to crosslink said poly-p-xylylene after said coating has been completely deposited on said conductive disc, said coating being conformal with said geometric variations.

2. An information storage means in accordance with claim 1 wherein said dielectric coating is poly-p-chloro-xylylene.

3. An information storage means in accordance with claim 1 wherein said coating has been hardened by exposure to said glow discharge for at least 30 seconds after said coating has been deposited on said conductive disc.

4. An information storage means in accordance with claim 3 wherein said coating is approximately 500A in thickness.

* * * * *